US008169922B2

(12) United States Patent
Qian et al.

(10) Patent No.: US 8,169,922 B2
(45) Date of Patent: May 1, 2012

(54) DIAGNOSING PROBLEMS ASSOCIATED WITH ROUTE GROUPS IN A NETWORK

(75) Inventors: Zhiqiang Qian, Holmdel, NJ (US); Paritosh Bajpay, Edison, NJ (US); Jackson Liu, Middletown, NJ (US); Michael Zinnikas, North Brunswick, NJ (US)

(73) Assignee: AT&T Intellectual Property I, LP, Atlanta, GA (US)

(*) Notice: Subject to any disclaimer, the term of this patent is extended or adjusted under 35 U.S.C. 154(b) by 518 days.

(21) Appl. No.: 11/963,099

(22) Filed: Dec. 21, 2007

(65) Prior Publication Data
US 2009/0161549 A1 Jun. 25, 2009

(51) Int. Cl.
*H04J 1/16* (2006.01)
(52) U.S. Cl. .................... 370/245; 370/248; 370/254
(58) Field of Classification Search .......... 370/216–228, 370/241–255
See application file for complete search history.

(56) References Cited

U.S. PATENT DOCUMENTS

| | | | |
|---|---|---|---|
| 6,178,235 | B1 | 1/2001 | Petersen et al. |
| 6,625,659 | B1 | 9/2003 | Aramizu et al. |
| 2002/0099773 | A1* | 7/2002 | Tsuru ............................ 709/204 |
| 2002/0167898 | A1 | 11/2002 | Thang et al. |
| 2006/0072589 | A1* | 4/2006 | Mandavilli et al. .......... 370/400 |
| 2006/0126495 | A1 | 6/2006 | Guichard et al. |
| 2006/0215579 | A1* | 9/2006 | Nadeau et al. ................ 370/254 |
| 2008/0031157 | A1* | 2/2008 | Tamboise et al. ............. 370/254 |
| 2010/0008253 | A1* | 1/2010 | Mellachervu et al. ........ 370/254 |

FOREIGN PATENT DOCUMENTS

| | | |
|---|---|---|
| WO | 00/62502 A3 | 10/2000 |
| WO | 01/89142 A2 | 11/2001 |
| WO | WO 2004004217 A1 * | 1/2004 |
| WO | 2004027640 A1 | 4/2004 |

OTHER PUBLICATIONS

Wikipedia. Traceroute. Sep. 14, 2006. <http://web.archive.org/web/20060914025555/http://en.wikipedia.org/wiki/Traceroute>.*
T. Nadeau and H. van der Linde. MPLS/BGP Layer 3 Virtual Private Network (VPN) Management Information Base. RFC 4382. Network Working Group. Feb. 2006.*
C. Perkins, E. Belding-Royer, and S. Das. Ad Hoc On-Demand Distance Vector (AODV) Routing. RFC 3561. Network Working Group. Jul. 2003.*

* cited by examiner

*Primary Examiner* — Hassan Kizou
*Assistant Examiner* — Ashil Farahmand
(74) *Attorney, Agent, or Firm* — Hoffman & Baron, LLP

(57) ABSTRACT

A system and method directed to diagnosing a problem associated with a route group in a network are disclosed. A problem associated with a route group is diagnosed by comparing inventory information associated with a route group to current route information associated with a router, where the router is associated with the route group. The process followed for diagnosing a problem associated with a route group depends on whether there is a mismatch between the inventory route information and the current route information.

12 Claims, 3 Drawing Sheets

DIAGNOSING PROBLEMS ASSOCIATED WITH ROUTE GROUPS IN A NETWORK

BACKGROUND OF THE INVENTION

1. Field of the Invention

The present invention relates to problems, such as a configuration error, associated with route groups in a network, and specifically, relates to automatically diagnosing problems associated with route groups in a network.

2. Brief Discussion of The Related Art

Conventional service provider networks generally include routers, such as edge routers and core routers, which route information from an originating source to a destination. Customers can connect to the service provider network by connecting to a provider edge (PE) router. The information being transmitted over the network can follow a multitude of routes. A route is a path followed by information in a network. The information may pass through one or more routers in the network that provide a connection between switching points or other network nodes. Routing schemes can determine which route or routes are available for transmitting information between nodes. These routing schemes may be static or dynamic. Routing schemes generally attempt to distribute the traffic load among available routes and enhance network security.

A route group represents a group of one or more customer sites that connect to a service provider's edge (PE) router. Route groups generally provide routing schemes to facilitate load balancing, routing policy, and cost reductions for customers who implement the route groups. The same routing policy is generally applied to the routes of a route group and each route group can have a unique set of routing policies.

In the event that there is a problem with a route group, such as a configuration error, the customer's service may be impacted and the customer may lose its routes. Typically, the service provider is charged with diagnosing and resolving the problem to minimize the downtime of the route groups. Generally, the service provider's technicians manually diagnose and resolve the problem. Such manual diagnostics can be time consuming and costly, both for the service provider and the customer. In addition, these manual diagnostic techniques can result in an inefficient use of the service provider's workforce.

Therefore an approach that automatically diagnoses problems associated with route groups and notifies an operator of the type and/or location of the problem is desirable.

SUMMARY OF THE INVENTION

The preferred embodiments of the present invention automatically diagnose problems associated with route groups in a network. Information associated with routes groups in a network can be accessed and used to determine whether there is a problem associated with the route groups. The preferred embodiments eliminate or reduce network downtime experienced by customers and can reduce the time and labor required of an operator to find, diagnose, and resolve the problem.

In one embodiment, a method of diagnosing a problem associated with a route group in a network is disclosed. The method includes comparing inventory information associated with a route group to current route information associated with a router and determining whether there is a problem associated with the route group based on the comparison. The router is associated with the route group.

In another embodiment, a system for diagnosing a problem associated with a route group in a network is disclosed. The system includes a computing device configured to compare inventory information associated with a route group to current route information associated with a router and to determine whether there is a problem associated with the route group based on the comparison. The router being associated with the route group. The system can include a storage device configured to store inventory information associated with the route group.

In yet another embodiment, a computer-readable medium comprising instructions executable by a computing device for diagnosing a problem associated with a route group in a network is disclosed. The instructions diagnose a problem associated with a route group in a network by comparing inventory information associated with a route group to current route information associated with a router and determining whether there is a problem associated with the route group based on the comparison. The router being associated with the route group.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE PREFERRED EMBODIMENTS

In accordance with the preferred embodiments of the present invention, a diagnostic engine allows a service provider to automatically diagnose problems associated with route groups in a network. A route group represents a group of one or more customer sites that implement a common routing policy and routes. Problems associated with route groups in a network can include, but are not limited to configuration errors and network problems, such as congestion. The diagnostic engine can preferably access information associated with routes groups in a network and can use this information to determine if there is a problem. When the diagnostic engine determines that a problem exists, a notification can be generated that identifies the type and/or location of the problem. Based on this notification an operator can resolve the problem.

The preferred embodiments enable service providers to detect and diagnose problems quickly to eliminate or reduce the network downtime experienced by a customer when a problem occurs. In some cases, the preferred embodiments may detect, diagnose, and resolve the problem before the customer becomes aware of the problem. In addition, the preferred embodiments can reduce the time and labor required of an operator to find, diagnose, and resolve the problem. This allows the service provider to provide a high quality of service while reducing costs associated with network maintenance.

Figure 1:
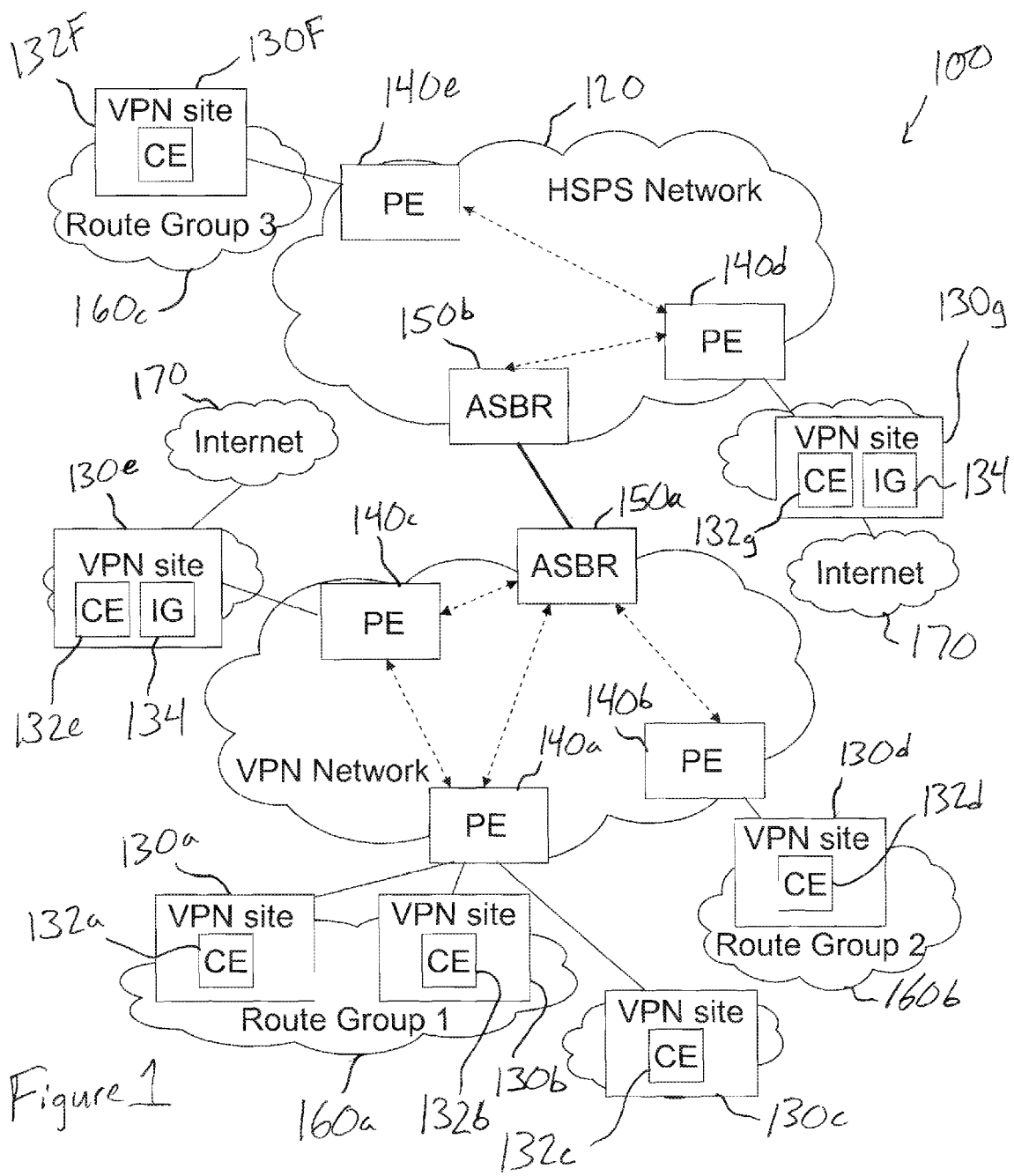
FIG. 1 shows an exemplary network in which the preferred embodiments of the present invention can be implemented.

FIG. 1 shows an exemplary network architecture 100 (hereinafter "network 100") in accordance with the preferred embodiments of the present invention. The network 100 includes a network-based Internet protocol virtual private network (NB-IPVPN) 110, a High Speed Packet Services (HSPS) network 120, and customer VPN sites 130 (130a-130g).

The NB-IPVPN 110 preferably provides a multipoint network for routing IP packets between customer VPN sites 130 (130a-130g). The NB-IPVPN includes provider edge (PE) routers 140 (140a and 140b) and an Autonomous System Boundary Router (ASBR) 150a. The PE routers 140 are on the periphery of the service provider network and route information through the network 100 from an originating source to a destination. The ASBR 150a allows the NB-IPVPN 110 to communicate with the HSPS network 120, which can utilize a different network protocol than the NB-IPVPN 110. Such routing between the NB-IPVPN 110 and the HSPS network 120 can be facilitated using a border gateway protocol defined by the Internet Engineering Task Force (IETF), such as version four of the Border Gateway Protocol (BGP4) defined in Request For Comments (RFC) 4271.

The HSPS network 120 provides Asynchronous Transfer Mode (ATM) and Frame Relay Services to facilitate high-speed transmission of voice, data, video and multimedia applications. The HSPS network can include PE routers 140 (140d-140e) and an ASBR 150b. The PE routers 140 route information through the network 100 from an originating source to a destination. The ASBR 150b connects with the ASBR 150a to facilitate communications between the NB-IPVPN 110 and the HSPS network 120.

The customer VPN sites 130 preferably provide a private network that is configured within the otherwise public network 100. The customer VPN sites 130 preferably include one or more customer edge (CE) routers 132 (132a-132g) to facilitate communication with the service provider network by communicatively coupling to the PE routers 140. Selected customer VPN sites 130e and 130g can include Internet gateways (IGs) 134 through which the customer VPN sites can access the Internet. Multiple customer VPN sites 130 can be connected to form a wide area network (WAN) that can include several locations. This allows customers with multiple sites to connect with each other as well as to the Internet 170 via IGs 134 at customer VPN sites 130e and 130g. The customer VPN sites can share the physical network with other customers.

The customer VPN sites 130 can be associated with route groups 160 (160a-160c). The route groups 160 represent a group of one or more customer sites that implement a common routing policy. For example, the route group 160a can implement a routing policy for the customer VPN site 130a and 130b, the route group 160b can implement a routing policy for the customer VPN site 130d, and the route group 160c can implement a routing policy for the customer VPN site 130f. The route groups 160a-160c can implement the same or different routing policies based on the customer's desired configuration.

The routing groups can constrain the routes that are available to a customer VPN site 130. As one example, when a user at the customer VPN site 130f wishes to access the Internet 170, the route which the information follows to get to the internet can be limited so that the user at the customer VPN site 130f can access the Internet 170 via the PE router 140d and the customer VPN site 130g. As another example, the customer VPN sites 130a and 130b that are associated with the route group 160a may be constrained such that access to the Internet is limited to routes that go though the customer VPN 130e based on the routing policy.

Virtual routing and forwarding (VRF) tables of routers (e.g., customer edge routers and provider edge routers) hold information related to the network 100 and are used to direct traffic through the network 100 by matching destination addresses to routes associated with the destination addresses. The VRF tables can implement VRF links linking one router to another router to facilitate transfer of traffic. Multiple instances of a routing table can co-exist within a given router without conflict because the instances can be independent. A VRF entry can select the next several hops in a route. The routers in network 100 presumably possess valid VRFs and consistency of the VRF can prevent configuration errors that result in, for example, routing loops. A configuration error, as used herein, refers to routing errors that can occur due to incorrect routing information.

Figure 2:
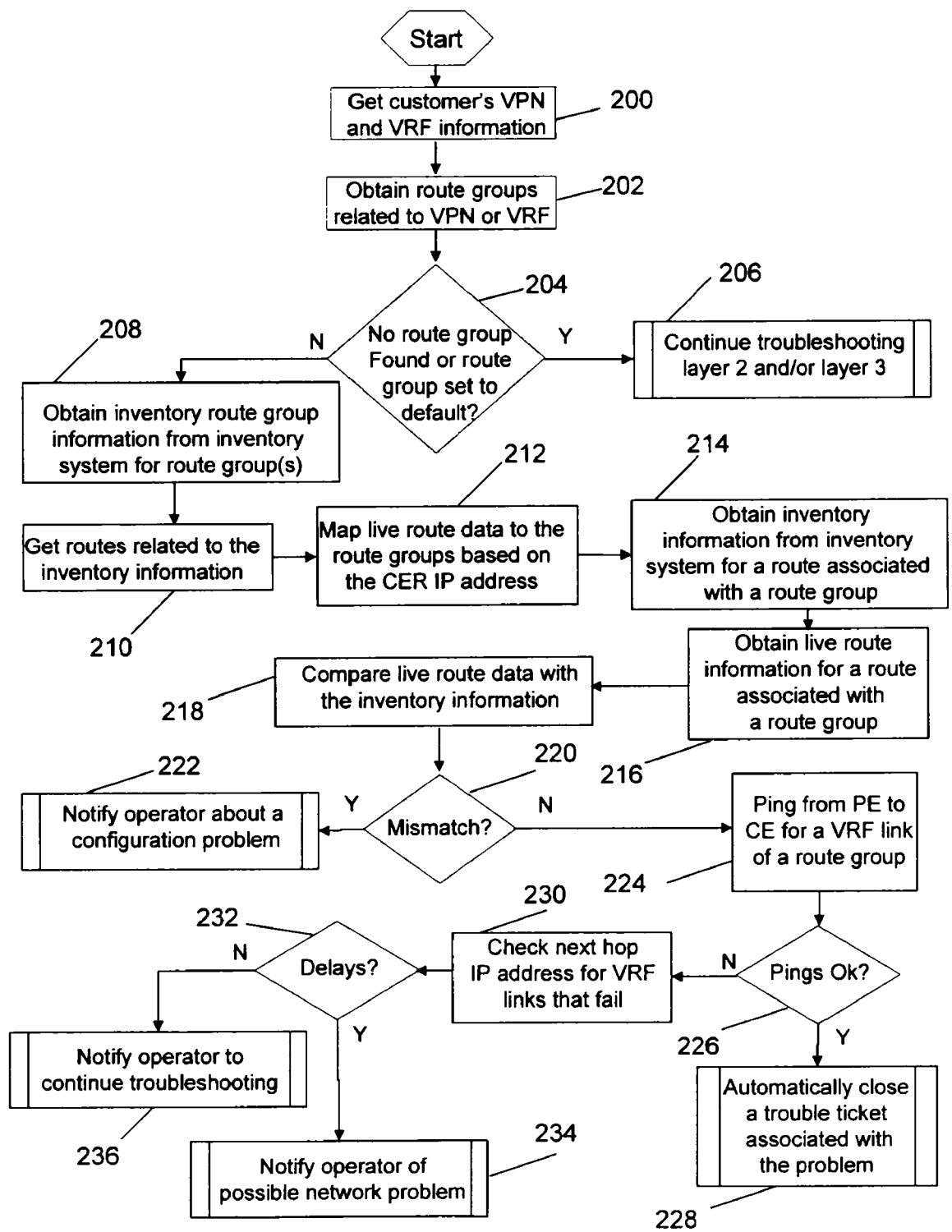
FIG. 2 is a flow chart that shows automatic diagnosis of problems associated with route groups in a network.

FIG. 2 is a flowchart showing an automatic diagnosis of problems associated with one or more route groups that is performed by the diagnostic engine in accordance with the preferred embodiments of the present invention. The diagnostic engine preferably obtains VPN and VRF information associated with a customer (step 200). The route groups related to the VPN or VRF is retrieved (step 202). If no route group is found or the route group is assigned to a default value that indicates no routing constraints exist (step 204), the diagnostic engine determines that the problem is not related to route groups and continues diagnosing the problem by performing layer 2 and 3 diagnostics (step 206). Otherwise, the diagnostic engine retrieves inventory route group information from an inventory system for the route group (step 208).

The inventory system is a database or storage device that collects customer information including route group information and VRF information. Some, all, or none of the information in the inventory system is static. The inventory route group information is information specified when the route group is set up and can include PE router IP addresses, CE router IP addresses, VRF names, and the like.

Subsequently, the diagnostic engine obtains and/or identifies one or more routes related to the route group inventory information (step 210) and maps current route information (i.e. current route information associated with a router operating in the network) to the route groups based on a selected CE router IP address (step 212). The current route information represents a present state of the information that implements routes in for a route group. The routes related to the inventory route group information can be obtained and/or identified by the diagnostic engine using commands known to those skilled in the art, such as the "show IP bgp vpnv4" command. The command can indicate the VRF name to obtain related routes. If multiple VRFs are retrieved from the inventory system, the related routes are obtained and/or identified.

The diagnostic engine obtains inventory route information from the inventory system for a route that is associated with an identified route group (step 214). The inventory route information can include a route target, community list, community value, a route map action, and the like. Route targets facilitate routing traffic from one network to another or from one region (North America) to another region (like Asia). A community list is a list of route groups with their unique characteristics, such as deny route or permit route. Community value is unique to particular route group list based on the priority and weight of the route. A route map action indicates whether the route is permitted or denied. For example, the diagnostic engine can retrieve the following inventory route information for a route that is associated with an identified route group:

```
VRF = 13979:12346
Route Target = 13979:26001
Route Group name = CL_RG_1
Community List = CL_RG_1_DENY
Community Value = 13979:3475
Route_Map_Action = Deny
Community List = CL_RG_1_Permit
Community Value = 13979:3480
Route_Map_Action = Permit
           ***
VPN = 12346
12.25.39.96/28 (CER IP Address)
12.38.196.34/32 (CER IP Address)
```

The diagnostic engine also obtains current route information (i.e. information associated with a router operating in the network) using a command(s) known to those skilled in the art, such as a "show IP bgp vpn4" command and/or a "show IP bgp neighbor" command (step 216). The command(s) can be executed based on the VRF and CE router IP addresses associated with the identified route group. The diagnostic engine can obtain the following current route information for a route that is associated with an identified route group using the "show IP bgp vpn4" command with the VRF name 13979:12346:

```
12.25.39.96/28 (route)      10.22.1.2 (next hop ip address)
12.38.196.34/32 (route)     10.22.1.2 (next hop ip address)
```

The diagnostic engine can obtain the following current route information for a route that is associated with an identified route group using the "show IP bgp neighbor" command with the VRF name 13979:12346 and route 12.25.39.96:
  12.25.39.96 (via 13979:12346) from 10.22.1.2
  Rigin IGP, localpref 100, weight 140, valid, external best
  Community: 13979:3480
  Extended Community: RT: 13979:26001

Once the diagnostic engine obtains the inventory and current route information, the diagnostic engine preferably compares the current route information to the inventory route information to determine if there is a mismatch (step 218). A mismatch, as used herein, refers to a difference between the inventory information and the current route information. If there is a mismatch (step 220), the diagnostic engine preferably notifies an operator that there is a configuration problem associated with the route group (step 222). Otherwise, as is the case in the above example, the diagnostic engine pings from the PE router to the CE router for one or more VRF links associated with a selected route group (step 224). If the ping is successful (step 226), a trouble ticket associated with the problem is automatically closed because no problems were detected (step 228). If the ping is not successful (step 226), the diagnostic engine checks the next hop IP address for VRF links that fail (step 230). The next hop IP address represents the address of the next router in a route. If there are any delays associated with the pings (step 232), the operator is notified of a possible network problem, such as congestion (step 234). If there are no delays (step 232), the diagnostic engine preferably notifies the operator to continue troubleshooting (step 236).

Figure 3:
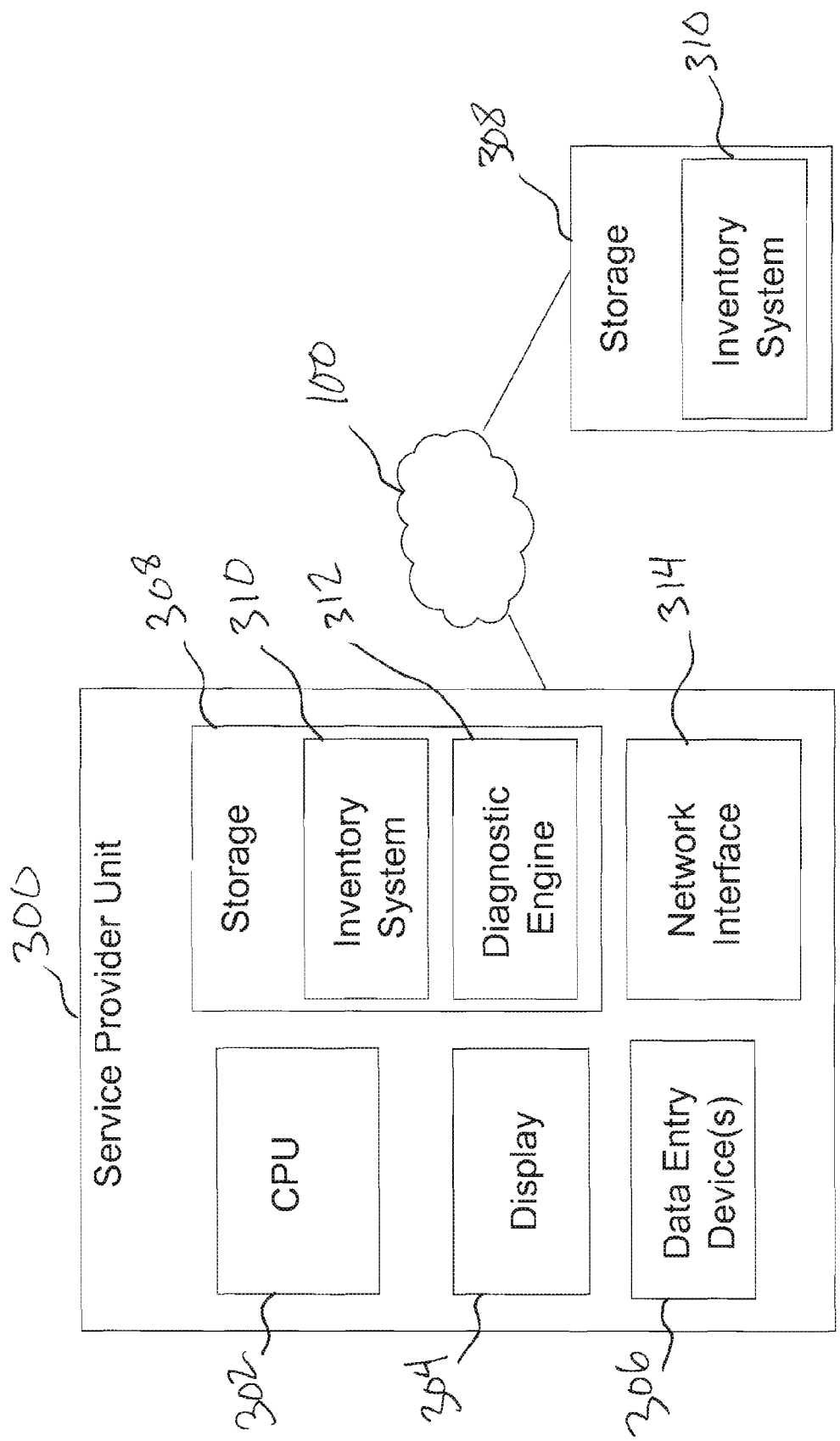
FIG. 3 is a block diagram of a service provider unit that is suitable for implementing a diagnostic engine that automatically diagnoses problems associated with route groups in a network.

FIG. 3 depicts an exemplary service provider unit 300 for implementing the test and diagnostics of the VPN network using the diagnostic engine. The service provider unit 300 can be a mainframe, personal computer (PC), laptop computer, workstation, handheld device, such as a PDA, or the like. In the illustrated embodiment, the service provider unit 300 includes a central processing unit (CPU) 302 and preferably a display device 304. The display device 304 enables the service provider unit 300 to communicate directly with an operator through a visual display. The service provider unit 300 can further include data entry device(s) 306, such as a keyboard, touch screen, and/or mouse. The service provider unit 300 can include storage 308 to store data and instructions. The storage 308 can include such technologies as a floppy drive, hard drive, tape drive, Flash drive, optical drive, read only memory (ROM), random access memory (RAM), and the like. The storage 308 can include an inventory system 310 for storing customer information including route group information and applications.

Applications, such as the diagnostic engine 312 for detecting and diagnosing problems associated with route groups in the network 100 as described above can be resident in the storage 308. The diagnostic engine 312 can include instructions for implementing those embodiments depicted in FIG. 2. The storage 308 can be local or remote to the service provider unit 300. The service provider unit 300 preferably includes a network interface 314 for communicating with the network 100 accessing the storage 308 via a communication network, such as communications network 100, when the storage 308 is implemented remotely. The CPU 302 operates to run the application in storage 308 by performing instructions therein and storing data resulting from the performed instructions, which may be presented to an operator via the display 304 or by other means known to those skilled in the art, such as a printer. The data can include a type of the problem, such as a configuration error or a network error, associated with the route groups in the network 100 so that the operator can quickly identify and resolve the problem.

The diagnostic engine 312 enables service providers to detect and diagnose problems associated with route groups in a network quickly, thereby eliminating or reducing network downtimes experienced by a customer when a problem occurs. The diagnostic engine 312 can detect, diagnose, and resolve problems before the customer becomes aware of the problem and can reduce the time and labor required by an operator to find, diagnose, and resolve the problem. As a result, the service provider can provide a high quality of service while reducing costs associated with network maintenance.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A method of diagnosing a problem associated with a route group in a network comprising:
   determining whether a route group associated with a virtual private network site exists, the virtual private network site being associated with a customer, route group existence information being retrieved from the virtual private network site in response to determining that the route group associated with the virtual private network exists;

mapping current route information stored in a virtual routing and forwarding table and associated with a customer edge router to the route group based on a selected customer edge router Internet Protocol address;

comparing inventory route information associated with the route group to current route information associated with the customer edge router using a service provider unit implementing a diagnostic engine, the router being associated with the route group;

determining, by the service provider unit, whether there is a problem associated with the route group based on whether there is a mismatch between the inventory route information and the current route information associated with the customer edge router in response to comparing inventory route information;

checking a virtual routing and forwarding link from a provider edge router to a customer edge router by the service provider unit in response to determining that there is no mismatch between the inventory route information and the current route information associated with the customer edge router; and checking a next hop Internet Protocol address for a failed virtual routing and forwarding link based on checking the virtual routing and forwarding link from the provider edge router to the customer edge router using the service provider unit.

2. The method of claim 1, further comprising determining a type of problem associated with the route group based on a determination that there is a mismatch between the inventory route information and the current route information.

3. The method of claim 2, wherein the type of problem comprises a configuration error.

4. The method of claim 1, further comprising:
determining whether a delay exists when the next hop Internet Protocol address is checked; and
determining there is a potential network problem in response to a determination that there is a delay.

5. The method of claim 1, wherein the inventory route information comprises at least one of a route target, community list, community value, and a route map action.

6. The method of claim 1, further comprising:
sending a command to the router in the network to request route information being used by the router;
receiving the current route information from the router in response to the command; and
retrieving the inventory route information from an inventory system.

7. A system for diagnosing a problem associated with a route group in a network comprising:
a storage device; and
a computing device operatively coupled to the storage device, the computer device being configured to determine whether the route group associated with a virtual private network site exists, the virtual private network being associated with a customer, route group existence information being retrieved from the virtual private network site in response to determining that the route group exists, the computing device being configured to map current route information stored in a virtual routing and forwarding table and associated with a customer edge router to the route group based on a selected customer edge router Internet Protocol address, the computing device being configured to compare inventory route information associated with the route group to current route information associated with the customer edge router, the computing device being configured to determine whether there is a problem associated with the route group based on whether there is a mismatch between the inventory route information and the current route information associated with the customer edge router in response to comparing inventory route information, the computing device being configured to check a virtual routing and forwarding link from a provider edge router to a customer edge router in response to determining that there is no mismatch between the inventory route information and the current route information associated with the customer edge router, the computing device being configured to check a next hop Internet Protocol address for a failed virtual routing and forwarding link based on checking the virtual routing and forwarding link from the provider edge router to the customer edge router, the router being associated with the route group.

8. The system of claim 7, further comprising:
a storage device configured to store inventory information associated with the route group.

9. The system of claim 7, wherein the inventory route information comprises at least one of a route target, community list, community value, and a route map action.

10. A non-transitory computer-readable medium comprising instructions that, when executed by a computing device, perform a computer process that diagnoses a problem associated with a route group in a network by:
determining whether a route groups associated with a virtual private network site exists, the virtual private network site being associated with a customer, route group existence information site being retrieved from the virtual private network site in response to determining that the route group associated with the virtual private network exists;

mapping current route information stored in a virtual routing and forwarding table and associated with a customer edge router to the route group based on a selected customer edge router Internet Protocol address;

comparing inventory route information associated with the route group to current route information associated with the customer edge router, the router being associated with the route group;

determining whether there is a problem associated with the route group based on whether there is a mismatch between the inventory route information and the current route information associated with the customer edge router in response to the comparing;

checking a virtual routing and forwarding link from a provider edge router to a customer edge router in response to determining that there is no mismatch between the inventory route information and the current route information associated with the customer edge router; and checking a next hop Internet Protocol address for a failed virtual routing and forwarding link based on checking the virtual routing and forwarding link from the provider edge router to the customer edge router.

11. The non-transitory medium of claim 10, wherein the computer process further comprises determining a type of problem associated with the route group based on a determination that there is a mismatch between the inventory route information and the current route information.

12. The non-transitory medium of claim 10, wherein the computer process further comprises:
determining whether a delay exists in response to the next hop Internet Protocol address being checked; and
determining whether there is a network problem in response to determining that the delay exists.

* * * * *